US009703810B2

(12) United States Patent
Chandler

(10) Patent No.: US 9,703,810 B2
(45) Date of Patent: *Jul. 11, 2017

(54) MANAGING RECORD LOCATION LOOKUP CACHING IN A RELATIONAL DATABASE

(71) Applicant: INTERNATIONAL BUSINESS MACHINES CORPORATION, Armonk, NY (US)

(72) Inventor: Allan T. Chandler, Floreat (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,423

(22) Filed: Nov. 30, 2015

(65) Prior Publication Data

US 2016/0085775 A1    Mar. 24, 2016

Related U.S. Application Data

(63) Continuation of application No. 13/445,144, filed on Apr. 12, 2012, now Pat. No. 9,251,179.

(51) Int. Cl.
*G06F 17/30*  (2006.01)

(52) U.S. Cl.
CPC .. *G06F 17/30289* (2013.01); *G06F 17/30292* (2013.01); *G06F 17/30321* (2013.01); *G06F 17/30339* (2013.01); *G06F 17/30595* (2013.01)

(58) Field of Classification Search
CPC ......... G06F 17/30289; G06F 17/30595; G06F 17/30321; G06F 17/30339
See application file for complete search history.

(56) References Cited

U.S. PATENT DOCUMENTS

| 4,947,320 | A | * | 8/1990 | Crus | G06F 17/30371 |
| 6,009,271 | A | | 12/1999 | Whatley | |
| 6,092,061 | A | * | 7/2000 | Choy | G06F 17/30339 |
| 6,163,783 | A | | 12/2000 | Hintz et al. | |

(Continued)

OTHER PUBLICATIONS

Office Action, Mailing Date Apr. 24, 2015, U.S. Appl. No. 13/445,144, filed Apr. 12, 2015, In Re Chandler, 44 pages.

(Continued)

*Primary Examiner* — Cam-Y Truong
(74) *Attorney, Agent, or Firm* — David Zwick; Amy J. Pattillo

(57) ABSTRACT

In managing a relational database, a relational manager sets a foreign key lookup value to an unavailable state in a source table row containing each of a foreign key value and the foreign key lookup value in a source table in a relational database, wherein the foreign key value references a primary key value in a referenced row in a separate destination table in the relational database. The relational manager, responsive to looking up, for the foreign key value, in a data structure separate from the source table, a location of the referenced row in the relational database, when the foreign key lookup value is set to the unavailable state, updating the foreign key lookup value with the location, wherein the foreign key lookup value in the source table is looked up for identifying the location of the referenced row for subsequent retrievals of the referenced row for the foreign key value.

20 Claims, 10 Drawing Sheets

(56) References Cited

U.S. PATENT DOCUMENTS

| | | |
|---|---|---|
| 7,966,343 B2 | 6/2011 | Yang et al. |
| 8,010,568 B2 | 8/2011 | Megerian |
| 2007/0294208 A1* | 12/2007 | Chowdhary ...... G06F 17/30306 |
| 2008/0059412 A1* | 3/2008 | Tarin ................. G06F 17/30592 |
| 2008/0162553 A1 | 7/2008 | Daga |
| 2009/0177621 A1 | 7/2009 | Le et al. |
| 2010/0153423 A1* | 6/2010 | Lu ....................... G06F 17/3038 707/759 |
| 2013/0275476 A1 | 10/2013 | Chandler et al. |

OTHER PUBLICATIONS

Notice of Allowance, Mailing Date Sep. 18, 2015, U.S. Appl. No. 13/445,144, filed Apr. 12, 2015, In Re Chandler, 144 pages.

* cited by examiner

MANAGING RECORD LOCATION LOOKUP CACHING IN A RELATIONAL DATABASE

CROSS REFERENCE TO RELATED APPLICATIONS

This application is a continuation of commonly assigned U.S. patent application Ser. No. 13/445,144, filed Apr. 12, 2012, which is hereby incorporated herein by reference.

TECHNICAL FIELD

The embodiment of the invention relates generally to database management and particularly to managing record location lookup caching in a relational database.

DESCRIPTION OF THE RELATED ART

Many systems run on a common Database Management System (DBMS) using a standard programming language, such as Structured Query Language (SQL). Many DBMS implementations, for example, Oracle®, IBM® DB2®, Microsoft® SQL, Sybase®, and MySQL, manage relational databases. Relational databases support data in one database table, such as a source table, referencing data in database another table, such as a destination table.

In general, a DBMS manages storage and retrieval of information in one or more databases. For example, a DBMS may include a client side where applications or users submit queries and a server side that executes the queries on a database and returns data collected from the database to the requesting client.

As the size of a supported database increases, the load on the DBMS, for storage and retrieval of information, increases. In addition, as the number of tables, number of entries within tables, and number of relationships between tables to reference related data increases, the time required to traverse through multiple tables with related data, in response to a query, also increases.

BRIEF SUMMARY

In view of the foregoing, there is a need for a method, system, and program product for maintaining relationships between relational database tables for efficient lookup and retrieval of records in a destination table, referred to by a one or more foreign keys in a source table.

In one embodiment of the invention, a method for managing a relational database includes a computer, setting a foreign key lookup value to an unavailable state in a source table row containing each of a foreign key value and the foreign key lookup value in a source table in a relational database, wherein the foreign key value references a primary key value in a referenced row in a separate destination table in the relational database, wherein the foreign key lookup value when set to a value other than the unavailable state refers to a location of the referenced row of the primary key value in the separate destination table. The method includes the computer, responsive to looking up, for the foreign key value, in a data structure separate from the source table, the location of the referenced row in the relational database, when the foreign key lookup value is set to the unavailable state, updating the foreign key lookup value with the location, wherein the foreign key lookup value in the source table is looked up for identifying the location of the referenced row for subsequent retrievals of the referenced row for the foreign key value.

In another embodiment of the invention, a computer system for managing a relational database includes one or more processors, one or more computer-readable memories and one or more computer-readable, tangible storage devices. The computer system includes program instructions, stored on at least one of the one or more storage devices for execution by at least one of the one or more processors via at least one of the one or more memories, to set a foreign key lookup value to an unavailable state in a source table row containing each of a foreign key value and the foreign key lookup value in a source table in a relational database, wherein the foreign key value references a primary key value in a referenced row in a separate destination table in the relational database, wherein the foreign key lookup value when set to a value other than the unavailable state refers to a location of the referenced row of the primary key value in the separate destination table. The computer system includes program instructions, stored on at least one of the one or more storage devices for execution by at least one of the one or more processors via at least one of the one or more memories, responsive to looking up, for the foreign key value, in a data structure separate from the source table, the location of the referenced row in the relational database, when the foreign key lookup value is set to the unavailable state, to update the foreign key lookup value with the location, wherein the foreign key lookup value in the source table is looked up for identifying the location of the referenced row for subsequent retrievals of the referenced row for the foreign key value.

In another embodiment of the invention, a computer program product for managing a relational database includes one or more computer-readable, tangible storage devices. The computer program product includes program instructions, stored on at least one of the one or more storage devices, to set a foreign key lookup value to an unavailable state in a source table row containing each of a foreign key value and the foreign key lookup value in a source table in a relational database, wherein the foreign key value references a primary key value in a referenced row in a separate destination table in the relational database, wherein the foreign key lookup value when set to a value other than the unavailable state refers to a location of the referenced row of the primary key value in the separate destination table. The computer program product includes program instructions, stored on at least one of the one or more storage devices, responsive to looking up, for the foreign key value, in a data structure separate from the source table, the location of the referenced row in the relational database, when the foreign key lookup value is set to the unavailable state, to update the foreign key lookup value with the location, wherein the foreign key lookup value in the source table is looked up for identifying the location of the referenced row for subsequent retrievals of the referenced row for the foreign key value.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
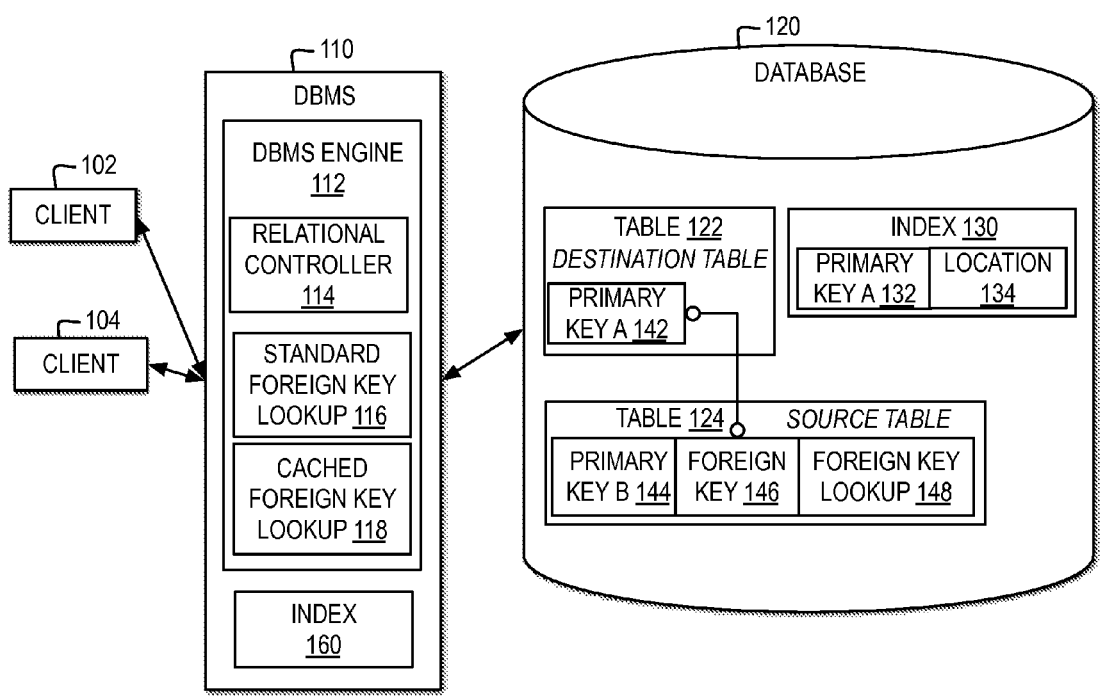
FIG. 1 illustrates a block diagram of a database management system (DBMS) for managing one or more relational databases for efficient retrieval of records in a destination table, through a source table.

FIG. 1 illustrates a block diagram of a database management system (DBMS) for managing one or more relational databases for efficient retrieval of records in a destination table, through a source table.

In the example, a DBMS 110 includes one or more instances of a DBMS engine 112 for managing storage and retrieval of data in one or more databases, including, but not limited to, a database 120, and for handling incoming storage requests, database queries, and other commands from one or more client systems, including, but not limited to client 102 and client 104. In the example, DBMS 110 may include additional or alternate instances of DBMS engine 112. In addition, in the example, additional or alternate DBMS may includes DBMS engines for managing storage and retrieval of data in database 120, such that database 120 is shared by multiple DBMS or multiple DBMS engines.

In one example, database 120 includes one or more tables. For example, database 120 includes a table 122 and a table 124. Each table is made up of one or more columns and one or more rows. Each column includes sets of values of a same data type. Each row includes a sequence of values, wherein the nth value of the row corresponds to the nth column of the table. Each row is identified by a unique value known as the primary key for the row. The primary key value may be a value from one column in a table or combination of values from multiple columns in a table.

In one example, database 120 may include multiple tables that are related, or joined, to one another. In one example, tables in database 120 are related to one another by setting a value in a column of a source table to a primary key value in a destination table. In the example, the column of a source table that includes values that refer to a value in a destination table is referred to as a foreign key column. The foreign key column in a source table contains only the values of one or more of the values of a primary key column of another, separate destination table. The values in the foreign key column of a source table establish a relationship between two tables because they refer to one or more rows of another, destination table. In another example, tables may be related to one another through one or more types of primary key-foreign key pairs or through other types of data joining tables.

In particular, in the example, table 122 is a destination table, referred to by table 124, a source table. In particular, in the example, table 122 includes one or more columns, and in particular, includes a primary key column, illustrated as a primary key A column 142. Each row in table 122 includes a unique value in primary key A column 142 for identifying each row within table 122. In addition, in particular, in the example, table 124 includes one or more columns, and in particular, includes a primary key column, illustrated as a primary key B column 144, a foreign key column 146, and a foreign key lookup column 148. Each row in table 124 includes a unique value in primary key B column 144 for identifying each row within table 124 and each row in table 124 includes one or more of the values matching values in primary key A column 142 of table 122, in foreign key column 146 of table 124. A relationship is established between table 122 and table 124 because foreign key column 146 of table 124 includes foreign key values that match the primary key values in primary key A column 142 of table 122. Foreign key lookup column 148, as will be further described, either includes a value set to an unavailable state or includes a location of a data record for a row in table 122.

In the example, DBMS engine 112 includes a relational controller 114 that manages storage and retrieval of referenced data from a destination table through a source table. In the example, relational controller 114 identifies a foreign key column in a table and adds a foreign key lookup column to the table with a value in each row of the foreign key lookup column initially set to an unavailable state. For example, relational controller 114 identifies a request to activate a cached foreign key lookup column for foreign key column 146, either automatically upon creation of foreign key column 146, at a first access request to table 124, at a first request to lookup a foreign key value for table 124, or through a user command to create or update a foreign key lookup column for foreign key column 146. Relational controller 114 creates foreign key lookup column 148, for foreign key column 146, with each value in foreign key lookup column 148 initially set to a value indicating an unavailable state. In one example, a value indicating an unavailable state may include one or more types of characters, including, but not limited to, a NULL value, a sentinel, or an empty value.

In addition, relational controller 114 handles any command that requires identifying a location of a referenced row in a destination table, through a source table, from among the multiple commands received by DBMS 110 from one or more client systems, also referred to as a command that requires a foreign key lookup. For example, relational controller 114 handles a request that requires identifying a location of the records for one or more referenced rows in table 122, identified by one or more primary key values in primary key A column 142, through one or more rows in table 124, with foreign key values in foreign key column 146 that match the one or more primary key values in primary key A column 142. As described herein, a command that requires identifying a location of a row in a destination table, through a source table, may also refer to a command that requires identifying a location of one or more records for a row in a destination table, a command that requires identifying a lookup value for a foreign key value, or other types of commands that require looking up information about related data entries in a relational database.

In one example, a command that requires identifying a location of a row in a destination table, through a source table, may include a query with a SELECT command for selecting a value from one or more rows in table 122, through one or more foreign key values in foreign key column 146. In another example, a command that requires identifying a location of a row in a destination table, through a source table, may include a command with an UPDATE command for updating each location value in foreign key lookup column 148 or for updating all location values in all foreign key lookup columns of a table, if a table includes multiple foreign key lookup columns.

In the example, when relational controller 114 handles a command that requires foreign key lookups, relational controller 114 initially checks the foreign key lookup value in a row in foreign key lookup column 148, for a corresponding foreign key value in the row referencing a primary key value identifying a row in table 122. If the foreign key lookup value for a row in table 124 is set to an unavailable state, then relational controller 114 uses a standard foreign key lookup 116 to lookup the location of the row in table 122 identified by the primary key valued referenced by the foreign key value corresponding to the foreign key value for the row in table 124. Standard foreign key lookup 116 looks up the location of the record for the referenced row in table 122 identified by the primary key value, using, for example, an index lookup or a full table scan, and returns the location to relational controller 114. Relational controller 114 caches the looked up location value in the foreign key lookup value for the row in table 124. Further, relational controller 114 may determine that a command requires accessing the record from the looked up location and retrieve the record referenced by a foreign key value by using standard foreign key lookup 116 to look up the location of the record referenced by the foreign key value, when the foreign key lookup value for the foreign key value is set to an unavailable state. For example, a query with a SELECT command requires identifying the location of a record for a row and retrieving the record for the row. Relational controller 114 performs steps to retrieve the record from database 120 from the location looked up using standard foreign key lookup 116 and returns the retrieved record in a response to a query.

In the example, standard foreign key lookup 116 may look up the location of the record for a referenced row identified by a primary key value by performing a full table scan of table 122 to identify the location of the referenced row, for each lookup request. In addition, standard foreign key lookup 116 may look up the location of the record for a referenced row identified by a primary key value by looking up the primary key value in an index, where the index includes primary key values for a table indexed to a location of the row identified by the primary key values, and where the index is a data structure separate from source table 124. In particular, relational controller 114 may create an index for one or more tables by performing a full table scan and indexing the location of each row for each primary key in a table at one time, in an index data structure. In one example, relational controller 114 may create an index 130, stored in database 120, separate from table 122 and table 124, or relational controller 114 may create an index 160, cached in memory accessible to DBMS 110. Index 130 includes, for example, a primary key A column 132 with the primary key values included in primary key A column 142 in table 122, indexed to a foreign key lookup column 134 with the locations of row records identified by the primary key values in table 122. Similarly, index 160 includes primary key values for table 122 indexed to locations of row records identified by the primary key values. In the example, primary key values may be indexed to location values in a list, as illustrated in index 130. In addition, additional or alternate types of indexing structures may be implemented in index 130 and index 160 including, but not limited to, b-tree, star, and target.

In another example, when relational controller 114 handles a command that requires identifying the location of a row in a destination table, through a source table, if relational controller 114 checks the foreign key lookup value in foreign key lookup column 148 and the foreign key lookup value is not set to an unavailable state, then relational controller 114 uses a cached foreign key lookup 118 to lookup the location of the record referenced by the foreign key value in the foreign key lookup value cached in table 124. Relational controller 114 performs steps to retrieve the record from database 120 from the location looked up using cached foreign key lookup 118, of the foreign key lookup value cached in table 124, and returns the retrieved record in a response to a query or other command.

In the example, when relational controller 114 retrieves a record from database 120 from a lookup using cached foreign key lookup 118, relational controller 114 may require validation of the retrieved record. In one example, relational controller 114 may validate a record retrieved using a foreign key lookup value from foreign key lookup column 148 by comparing the primary key value in the retrieved record with the foreign key value in the row with the foreign key lookup value in table 124. If the primary key value in the retrieved record matches the foreign key value in the row with the foreign key lookup value, then the record retrieved from the foreign key lookup location, by calling cached foreign key lookup 118, is validated. In the example, by maintaining a foreign key value and a foreign key lookup value in a same row, together in a table, relational controller 114 may use the foreign key value to validate a record retrieved using the foreign key lookup value, where the record is for the row identified by the primary key value matching the foreign key value. In particular, in the example, the foreign key value is not replaced by the foreign key lookup value, but instead both values are maintained in a same table. In contrast, if the foreign key value were replaced by the foreign key lookup value, validation of a record retrieved using the foreign key lookup value would require additional steps to verify that the current record retrieved using the foreign key lookup value is still the record identified by the primary key value matching the original foreign key value.

As illustrated in the example, performing one full table scan and creating an index of multiple primary key values for a table and the locations of records identified by the multiple primary key values and standard foreign key lookup 116 looking up locations from the index, is more efficient, in many cases, than standard foreign key lookup 116 performing a separate full table scan each time a location of a record identified by a primary key value referenced by a foreign key value needs to be identified. In addition, in the example, caching a location looked up by standard foreign key lookup 116, in a foreign key lookup column in a source table, with an associated foreign key, and calling cached foreign key lookup 118 to use the cached foreign key lookup value from the source table for subsequent requests requiring retrievals of the records identified at the foreign key lookup values, is even more efficient than calling standard foreign key lookup 116 to look up a location of a record identified by a primary key value referenced by a foreign key value each time the record is requested. In particular, while caching the foreign key lookup value in a table uses additional space, the tradeoff to the increased space is increased speed for retrieving related data records because cached foreign key lookup 118 only needs to pass a table value to relational controller 114 for retrieving the record at the location identified by the table value. In particular, in the case where a portion of an index must be loaded into memory, before the index is searched, by caching the location looked up from the index in table 124, for a next command requiring a retrieval of the record from the location, the index need not be loaded again into memory and searched, thus improving the efficiency of a record retrieval. Moreover, in the example where database 120 is shared by multiple DBMS or multiple DMBS engine instances, by caching a location looked up by one DBMS engine, in foreign key lookup column 148 of table 124, for subsequent requests to retrieve the record identified by the primary key value referenced by a foreign key value, any of the DBMS sharing database 120, no additional call to a standard foreign key lookup is required by any of the DBMS because each DBMS may retrieve the record using the foreign key lookup value from table 124.

In one example, DBMS 110 may monitor the current traffic levels on DBMS 110, on database 120, and on any network connections, and automatically perform updates to foreign key lookup columns of tables in database 120 during periods of time with low traffic, such that an entire foreign key lookup column may be populated during down time, reducing the number of times standard foreign key lookup 116 may be called during peak traffic times. In addition, where multiple DBMS share database 120, the DBMS may communicate traffic levels to one another in a peer-to-peer network or may communicate traffic levels to a controller, and a particular DBMS or a controller may select, during periods of time with low traffic, for one or more of the DBMS to each control updates to the foreign key lookup columns of a separate selection of tables from among the multiple tables. For example, a particular DBMS or controller may select for one DBMS to update the foreign key lookup column in a first table and a second DBMS to update the foreign key lookup column in a second table and a third table, such that the load for performing lookups and caching the looked up locations in source tables is distributed among multiple DBMS. Similarly, a particular DBMS or controller may select, based on traffic levels across one or more DBMS sharing database 120, for one or more of the DBMS to each create or update an index for a selection of one or more tables.

Figure 2:
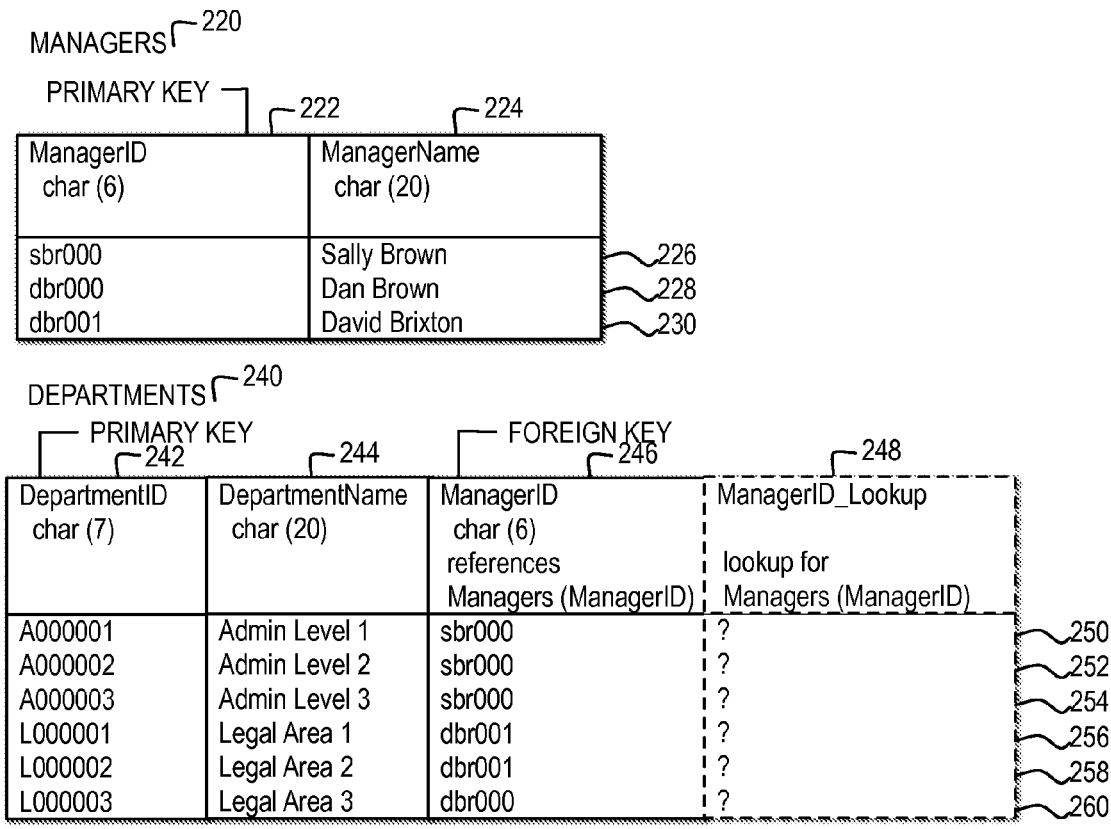
FIG. 2 illustrates a block diagram of related tables in a database, including a foreign key lookup column created in the source table with an associated foreign key column.

FIG. 2 illustrates one example of a block diagram of related tables in a database, including a foreign key lookup column created in the source table with an associated foreign key column.

In the example, a database includes a managers table 220, which includes a first column 222, labeled "ManagerID", identified as the primary key for managers table 220, and including unique data values of a maximum length of six (6) characters. In addition, managers table 220 includes a second column 224, labeled "ManagerName", including data values of a maximum length of twenty (20) characters. In the example, managers table 220 includes a first row 226, with a record "sbr000: Sally Brown", a second row 228, with a record "dbr000: Dan Brown", and a third row 230, with a record "dbr001:David Brixton". In additional or alternate embodiments, managers table 220 may include additional or alternate rows, and may include additional or alternate columns.

In the example, the database also includes a departments table 240, which includes a first column 242, labeled "DepartmentID", identified as the primary key for departments table 240, and including unique data values of a maximum length of seven (7) characters. In addition, departments table 240 includes a second column 244, labeled "DepartmentName", including data values of a maximum length of twenty (20) characters. In addition, departments table 240 includes a third column 246, labeled "ManagerID", identified as a foreign key for departments table 240, and including unique data values matching one or more of the primary key values in first column 222 of managers table 220. Further, departments table 240 includes a fourth column 248, labeled "ManagerID_Location", created as a foreign key lookup column associated with the foreign key values of third column 246, and including data values for record locations, or other lookup identifiers. In the example, departments table 240 includes a first row 250, with a record "A000001: AdminLevel1:sbr000:?", a second row 252, with a record "A000002: AdminLevel2:sbr000:?", a third row 254, with a record "A000003: AdminLevel3:sbr000:?", a fourth row 256, with a record "L000001: LegalArea1: dbr001:?", a fifth row 258, with a record "L000002: LegalArea2:dbr001:?", and a sixth row 260, with a record "L000003: LegalArea3:dbr000:?".

In the example, departments table 240 references managers table 220 through the foreign key values set in third column 246 each referencing one or more primary key values set in first column 222 of managers table 220. Departments table 240 represents a source table and managers table 220 represents a destination table. In the example, fourth column 248, when created as a foreign key lookup column associated with the foreign key values of third column 246, includes values initially set to an unavailable state, through the use of a sentinel, null value, empty value, or other characters. In one example, the foreign key lookup column is added to departments table 240 to hold locations of records of rows in another table referred to by associated foreign key values in departments table 240, and relational controller 114 uses the locations held in the foreign key lookup column for retrieving records of rows from another table, but any data values in the foreign key lookup column are not returned with results to a requesting client. In another example, through the use of a command specified for the foreign key lookup column, a user may request the results of the data values in the foreign key lookup column.

Because the foreign key values set in third column 246 reference one or more primary key values set in first column 222 of managers table 220, for a request handled by relational controller 114 that requires retrieving the data referred to by a foreign key value in third column 246 of departments table 240, the location of the record identified by the primary key value in managers table 220 referred to by the foreign key value in departments table 240, needs to be identified. In the example, because the foreign key lookup values in foreign key lookup column 248 are all set to an unavailable state, relational controller 114 may trigger standard foreign key lookup 116 to lookup a location referred to by a foreign key value. Standard foreign key lookup 116 may lookup the location from an index for managers table 220 or by performing a full table scan of managers table 220, for example.

Figure 3:
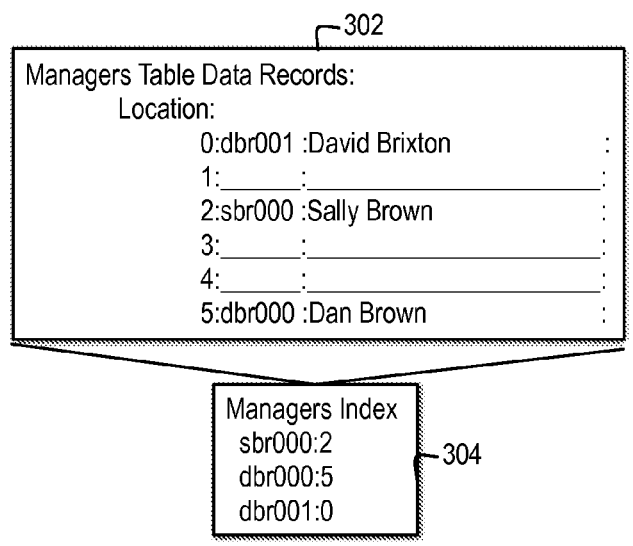
FIG. 3 illustrates a block diagram of an index of primary key values and locations of row records identified by primary key values, for a destination table.

FIG. 3 illustrates one example of a block diagram of an index of primary key values and locations of row records identified by primary key values, for a destination table.

In the example, managers table data records 302 provide an illustrative example of the locations of data records for rows of managers table 220, a destination table referenced by departments table 240. In the example, as illustrated in managers table data records 302, the row identified by primary key value "dbr001" is at a location of "0", the row identified by primary key value "sbr000" is at a location of "2", and the row identified by primary key value "dbr000" is at a location of "5". There are no records at locations "1", "3", or "4".

In the example, a managers index 304 may represent an index of the primary key values and locations of row records identified by primary key values, from managers table 220. In the example, managers index 304 includes an index structure with primary key values indexed to locations, reflecting the locations of records identified by primary keys in managers table data records 302, including "sbr000:2", "dbr000:5", and "dbr001:0", where "sbr000", "dbr000", and "dbr001" are primary key values and "2", "5", and "0" are the locations of row records, including, and identified by, each of the primary key values. In the example, the locations identified as "2", "5", and "0" are illustrative examples of lookup locations, which may also include physical or logical locations, index locations, or other types of location identifiers and the locations may be identified by additional or alternate numeric, alphanumeric, and other types of identifiers. The type of index structure used to hold the primary key values indexed to locations for managers index 304 may vary, and may include index types including, but not limited to, b-tree, star, and target.

Figure 4:
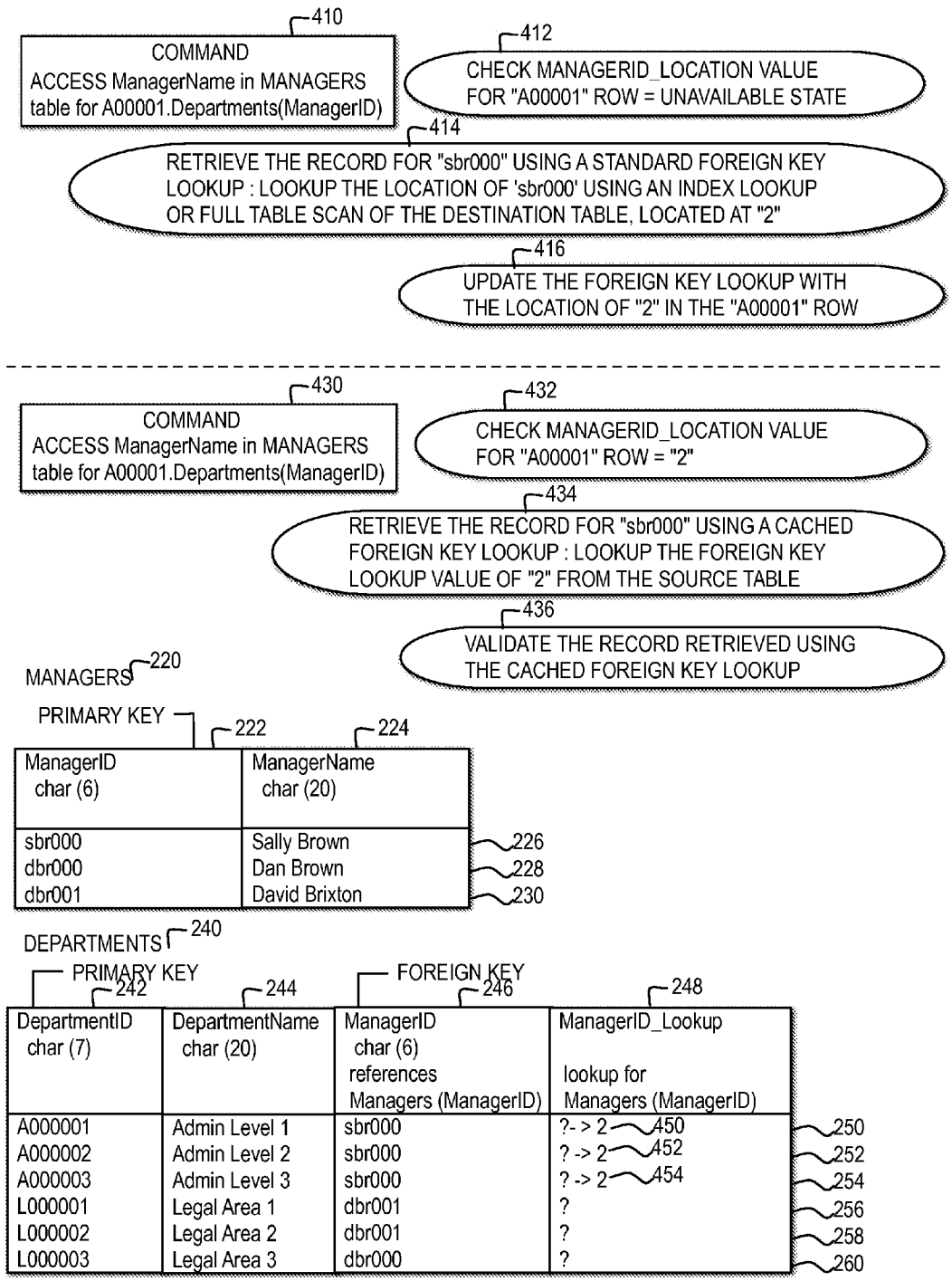
FIG. 4 illustrates a block diagram of related tables in a database, including a foreign key lookup column created in the source table with an associated foreign key column and updated with looked up locations.

FIG. 4 illustrates one example of a block diagram of related tables in a database, including a foreign key lookup column created in the source table with an associated foreign key column and updated with looked up locations.

In the example, a command 410, for example, is illustrated with a command of "ACCESS ManagerName in MANAGERS table for A00001.Departments(ManagerID)". Command 410 includes a requirement to access the row identified by primary key "A00001" of departments table 240, which is row 250, and to access a referenced row for the foreign key value, labeled "ManagerID", for row 250, which is "sbr000". In the example, the referenced row for the foreign key value "sbr000" is identified by the primary key value "sbr000" in managers table 220, identified as row 226. In the example, foreign key lookup column 248, the foreign key lookup column for the foreign key "ManagerID" of third column 246, includes all values initially set to an unavailable state.

In the example, command 410 represents a request requiring identifying a location of a record identified by a primary key value referenced by a foreign key value, also referred to as a request requiring a foreign key lookup. As illustrated at reference numeral 412, relational controller 114 checks the "ManagerID_Location" value, or foreign key lookup value, for the row identified by "A00001", which is row 250, and identifies that the foreign key lookup value is set to an unavailable state. Because the foreign key lookup value for row 250 is set to an unavailable state, as illustrated at reference numeral 414, relational controller 114 retrieves the record for "sbr000" using standard foreign key lookup 116, where standard foreign key lookup 116 requires looking up the location of "sbr000" using an index lookup, such as an index lookup in managers index 304, or full table scan of managers table 220, and identifying the lookup location of "2". Next, as illustrated at reference numeral 416, relational controller 114 updates the foreign key lookup value in the row identified by primary key value "A00001", which is row 250, with the looked up location of "2". In particular, the foreign key lookup value in row 250 is updated in departments table 240 from an unavailable state to "2", as illustrated at reference numeral 450.

In the example, by updating the foreign key lookup value in row 250 with a looked up location, as illustrated at reference numeral 450, for any subsequent commands that require identifying the location of the record identified by the primary key value referenced by the foreign key value in row 250, relational manager 114 may forego the standard foreign key lookup steps illustrated at reference numeral 414 to identify the location, and only need to pass the foreign key lookup value in row 250, which identifies the location of the record identified by the primary key value referenced by the foreign key value in row 250, to relational controller 114 for retrieval of the record from the identified location. In particular, relational controller 114 reduces the number of calls to standard foreign key lookup 116 by caching the looked up locations in column 248 of departments table 240.

In the example, a command 430, is the same command illustrated in command 410, and includes a requirement to access the row identified by primary key "A00001" of departments table 240, which is row 250, and to access a referenced row for the foreign key value, labeled "ManagerID", for row 250, which is "sbr000". In the example, command 430, which requests the same information as command 410, is processed after command 410 is processed. As illustrated at reference numeral 432, relational controller 114 checks the "ManagerID_Location" value, or foreign key lookup value, for the row identified by "A00001", which is row 250, and identifies that the foreign key lookup value is not set to an unavailable state, as illustrated at reference numeral 450. Because the foreign key lookup value for row 250 is not set to an unavailable state, as illustrated at reference numeral 434, relational controller 114 retrieves the record for "sbr000" using cached foreign key lookup 118, where cached foreign key lookup 118 looks up the foreign key lookup value of "2" from the source table. In addition, as illustrated at reference numeral 436, relational controller 114 may validate the retrieved record against the foreign key value in row 252 of "sbr000" by comparing the foreign key value of "sbr000" with the primary key value in the retrieved record, and validating the retrieved record if the foreign key value matches the primary key value.

In the example, by maintaining the foreign key value in departments table 240, with the foreign key lookup value, the foreign key value is quickly accessible for validating a record retrieved using the foreign key lookup value. If the foreign key value is not maintained in the table with the foreign key lookup value, validation of each record retrieved using the foreign key lookup value would first require steps to identify the original foreign key value or steps to verify that the location of the row identified by the primary key value referenced by the original foreign key value has not changed since the foreign key lookup value was updated with the location upon lookup.

In one example, relational controller 114 may automatically set a requirement for validation of records retrieved using the foreign key lookup value or may set a requirement for validation of records retrieved using the foreign key lookup value, subject to one or more events. For example, relational manager 114 may monitor for events that indicate that the location of a table row has changed, and if an event indicating that the location of a table row may have changed occurs, relational controller 114 may set the requirement for validation of records for a particular table, a particular portion of a database, or for an entire database. Examples of events that indicate that the location of a table row has changed may include, but are not limited to, a full table unload and reload, the clearing of cache, and any operation that disables foreign key constraints.

In the example, when a foreign key lookup value is set to a location, such as caching the location of "2" for the foreign key lookup value in row 250, as illustrated at reference numeral 450, relational controller 114 may automatically update the foreign key lookup values in other rows in the destination table with foreign key values that reference the same foreign key value as the updated row. For example, as illustrated at reference numerals 452 and 454, relational controller 114 may automatically update the foreign key lookup values in rows 252 and 254 from a "?" to a "2", because each of these rows include the same foreign key value "sbr000" as row 250.

Figure 5:
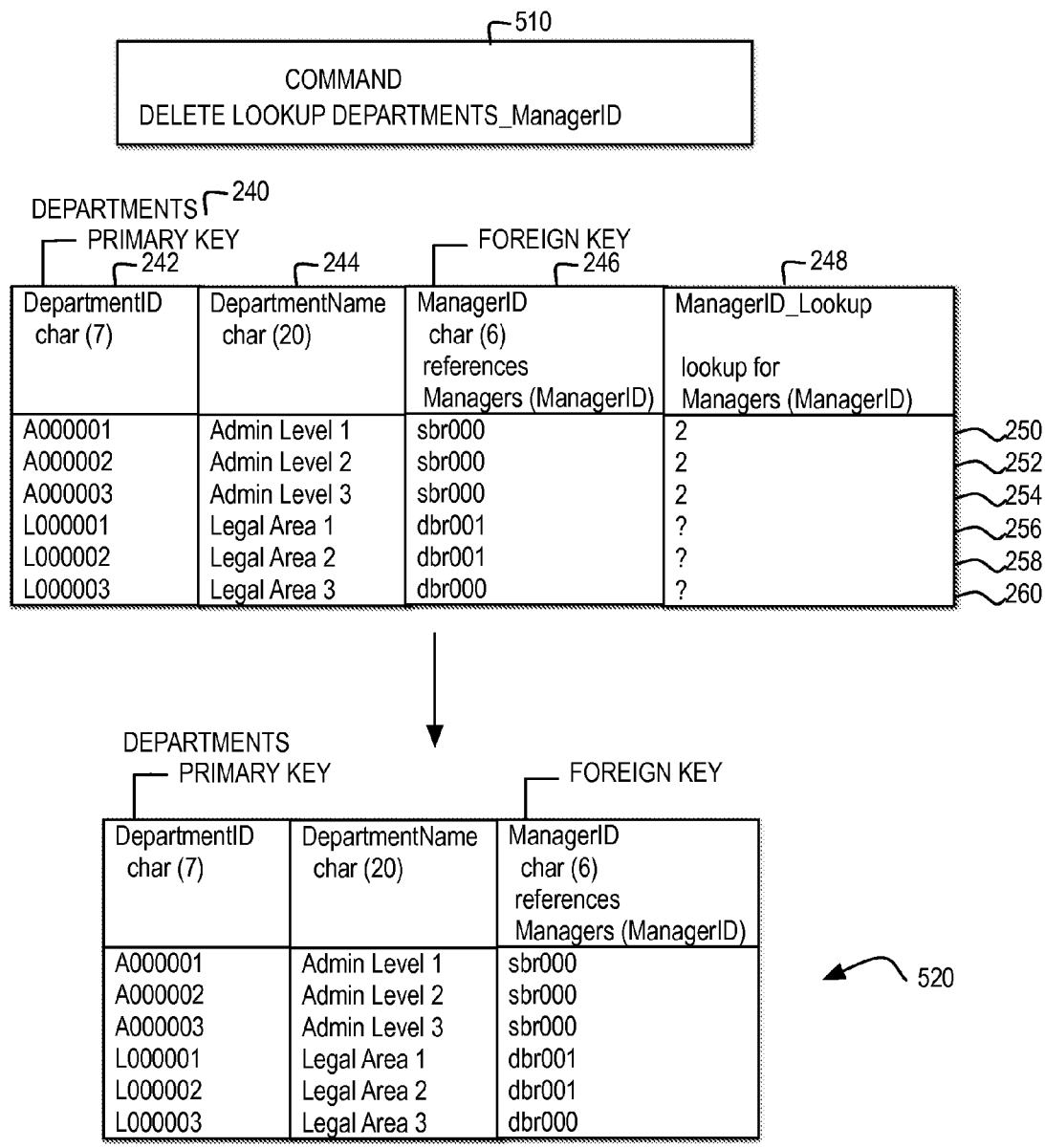
FIG. 5 illustrates a block diagram of one example of a relational controller deleting a foreign key lookup column from a destination table.

FIG. 5 illustrates one example of a block diagram of a relational controller deleting a foreign key lookup column from a destination table.

In the example, departments table 240 represents a destination table that includes foreign key lookup column 248 for cached locations for one or more foreign key values associated with foreign key column 246. In the example, a command 510 includes a command that requests the deletion of foreign key lookup column 248. In one example, command 510 includes "DELETE LOOKUP DEPARTMENTS_ManagerID", where "DEPARTMENTS" refers to departments table 240, "ManagerID" refers to foreign key column 246, and the lookup column for "ManagerID" is foreign key lookup column 248. In the example, responsive to command 510, relational controller 114 removes foreign key lookup column 248 from departments table 240, as reflected at reference numeral 520.

While command 510 illustrates one type of command that requests the deletion of foreign key lookup column 248, in other examples, one or more types of commands may request the deletion of foreign key lookup column 248. For example, a command may request the deletion of all foreign key lookup columns from a particular table or from multiple tables and may include a command that specifies the identifier for foreign key lookup column 248 or that generically refers to lookup columns associated with foreign key columns.

In addition, while command 510 requests the deletion of foreign key lookup column 248, in another example, a command may request the deactivation of the cached foreign key lookup values in foreign key lookup column 248, where relation controller 114 processes a deactivation request by returning all values in foreign key lookup column 248 to an unavailable state as illustrated in FIG. 2.

Figure 6:
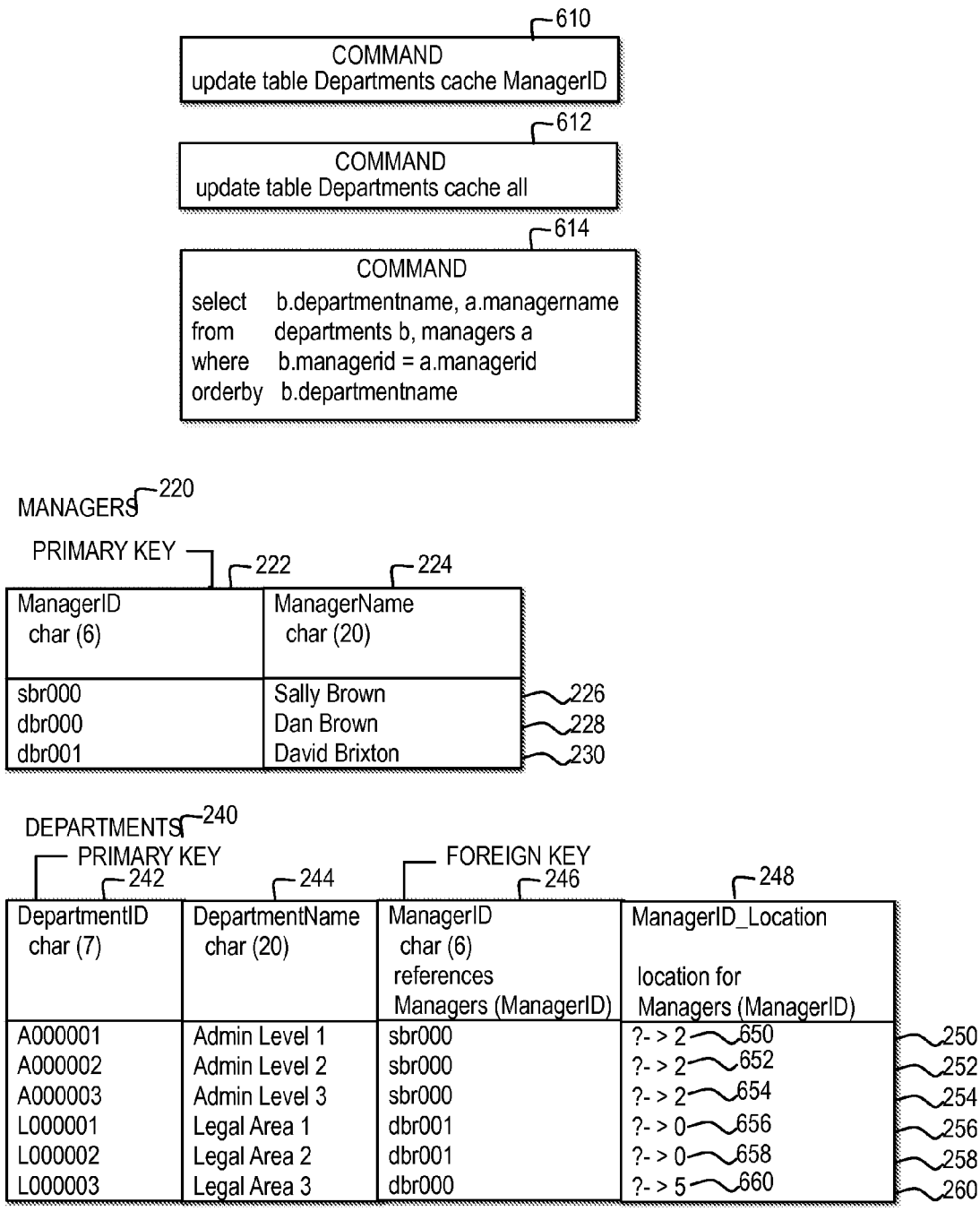
FIG. 6 illustrates a block diagram of one example of related tables in a database, including a foreign key lookup column created in the source table with an associated foreign key column, where the foreign key lookup column for a table is fully populated responsive to a single command or query.

FIG. 6 illustrates one example of a block diagram of related tables in a database, including a foreign key lookup column created in the source table with an associated foreign key column, where the foreign key lookup column for a table is fully populated responsive to a single command or query.

In the example, each of command 610, command 612, and command 614 trigger requests that require identifying a separate location for each record identified by each primary key value in a destination table, referenced by each foreign key value in a source table, resulting in the automatic population of the foreign key lookup column in the source table. In particular, the execution of each of command 610, command 612, and command 614 results in the automatic population of foreign key lookup column 248 in departments table 240.

In particular, in the example, command 610 includes an UPDATE command, "UPDATE table Departments cache ManagerID", which requests an update of a particular foreign key lookup column for the specified foreign key, for example the foreign key lookup column for foreign key "ManagerID" in the specified table, "Departments". In another example, command 612 includes an UPDATE command "UPDATE table Departments cache ALL", which is an example of a request to update all foreign key lookup columns for all foreign keys in the specified table, departments table 240. In the example, each of command 610 and command 612 trigger the activation of cached foreign key lookups, which triggers the creation of a foreign key lookup column for the specified foreign key or for all foreign keys and triggers caching a location for each foreign key lookup value in each specified foreign key lookup column. In the example, an UPDATE command also represents a type of command that requests the caching of foreign key lookup column values without retrieving the records from the identified locations.

In addition, in the example, command 614 includes a query with a SELECT command, where a SELECT command triggers identifying locations of records and retrieving the records from the identified locations. In particular, command 614 specifies a SELECT command for selecting the Department Name from each row in departments table 240 and for selecting, through each Manager ID foreign key in departments table 240, the Manager Name from each row in managers table 220.

In the example, relational controller 114 may populate each foreign key lookup value in foreign key lookup column 248 by using standard foreign key lookup 116 to lookup, in a data structure separate from departments table 240, the location of the referenced row for a primary key value in managers table 220 referred to by a foreign key value from foreign key column 246. For example, standard foreign key lookup 116 may lookup the locations of the foreign key values in departments table 240, which reference primary key values in managers table 220, within managers index 304. In the example, as illustrated at reference numeral 650, relational controller 114 caches a foreign key lookup of "2"

for foreign key "sbr000" in row 250. As illustrated at reference numeral 652, relational controller 114 caches foreign key lookup of "2" for foreign key "sbr000" in row 252. As illustrated at reference numeral 654, relational controller 114 caches a foreign key lookup of "2" for foreign key "sbr000" in row 254. As illustrated at reference numeral 656, relational controller 114 caches a foreign key lookup of "0" for foreign key "dbr001" in row 256. As illustrated at reference numeral 658, relational controller 114 caches a foreign key lookup of "0" for foreign key "dbr001" in row 258. As illustrated at reference numeral 660, relational controller 114 caches a foreign key lookup of "5" for foreign key "dbr000" in row 260.

Figure 8:
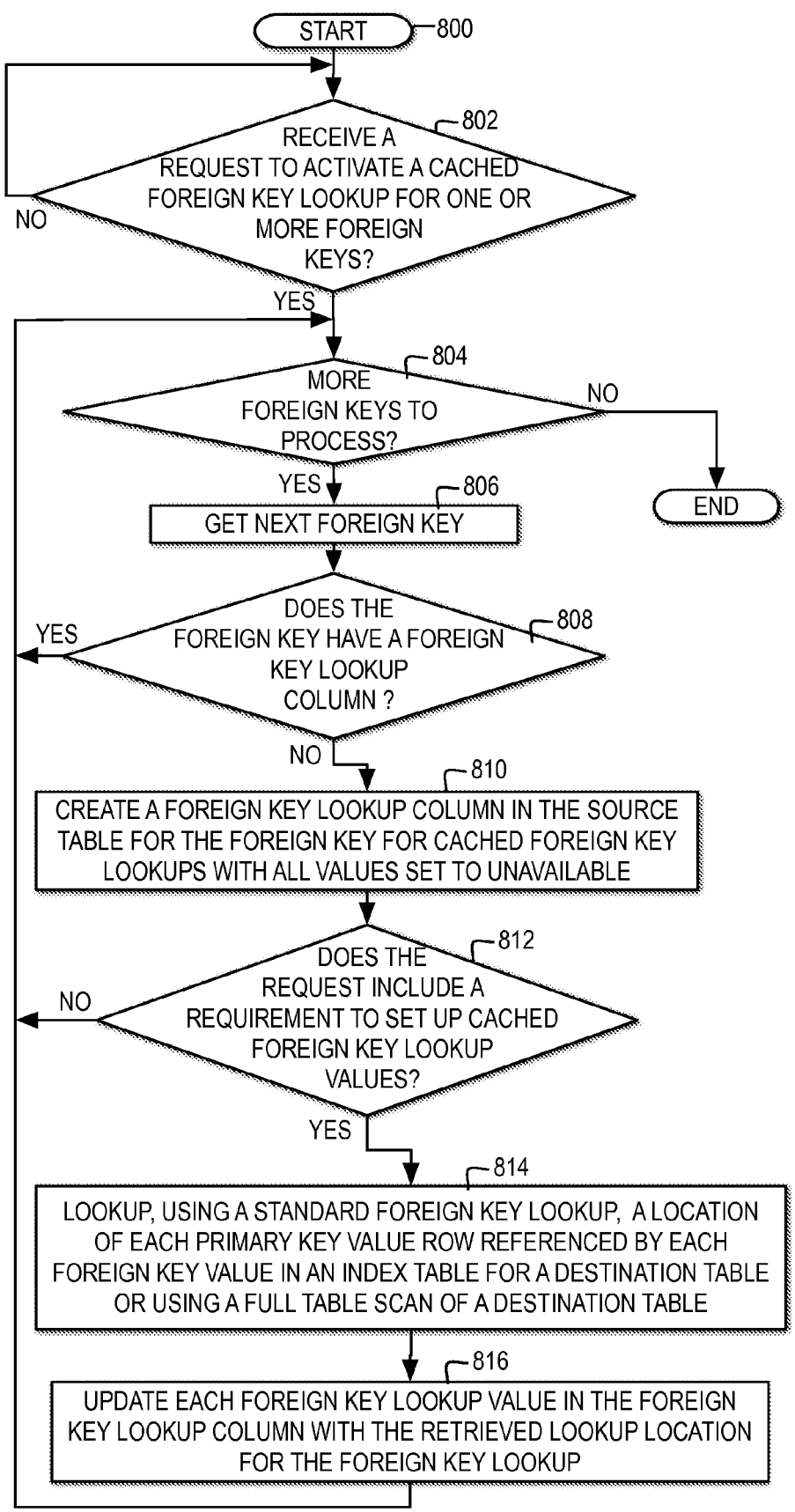
FIG. 8 illustrates a high-level logic flowchart of a process and program for activating a foreign key lookup column in a source table and automatically populating the foreign key lookup column.

In the example, relational controller 114 may handle each of command 610, command 612, and command 614 as requests to activate cached foreign key lookups for the specified foreign keys, as illustrated in FIG. 8. In addition, in the example, relational controller 114 handles command 610 and 612 as requests that include a requirement to set up cached lookup values, as illustrated in FIG. 8, and handles command 614 as requests that include a requirement for foreign key lookups for accessing records in a destination table, as illustrated in FIG. 10.

In the example, by populating foreign key lookup column 248 for all the rows in departments table 240, responsive to a single command, for all subsequent commands that require identifying the location of a row record identified by a primary key value, as referenced by a foreign key value in departments table 240, relational manager 114 need only call cached foreign key lookup 118 to lookup the foreign key location values from foreign key lookup column 248 in departments table 240. In one example, relational controller 114 may schedule commands such as command 610 and command 612 to be executed during a low traffic period, such that standard foreign key lookup 116 is only triggered during low traffic periods to populate foreign key lookup column 248 and any subsequent lookups during higher traffic periods trigger cached foreign key lookup 118 to lookup foreign key location values in foreign key lookup column 248 in departments table 240.

Figure 7:
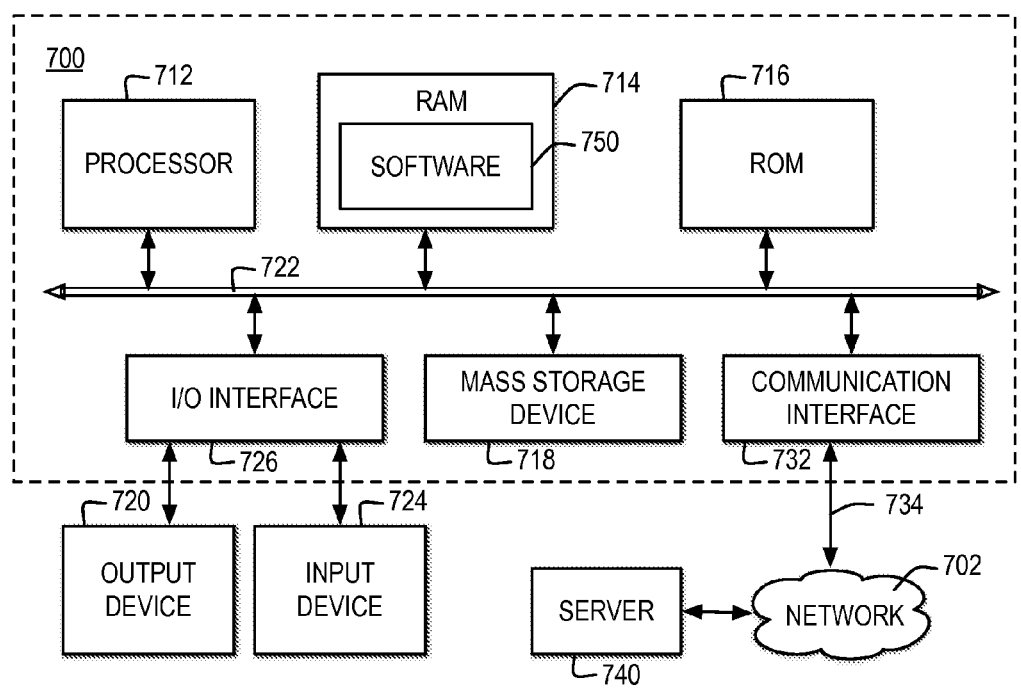
FIG. 7 illustrates a block diagram of one example of a computer system in which one embodiment of the invention may be implemented.

FIG. 7 illustrates one example of a computer system in which one embodiment of the invention may be implemented. The present invention may be performed in a variety of systems and combinations of systems, made up of functional components, such as the functional components described with reference to computer system 700 and may be communicatively connected to a network, such as network 702.

Computer system 700 includes a bus 722 or other communication device for communicating information within computer system 700, and at least one hardware-processing device, such as processor 712, coupled to bus 722 for processing information. Bus 722 preferably includes low-latency and higher latency paths that are connected by bridges and adapters and controlled within computer system 700 by multiple bus controllers. When implemented as a server or node, computer system 700 may include multiple processors designed to improve network servicing power. Where multiple processors share bus 722, additional controllers (not depicted) for managing bus access and locks may be implemented.

Processor 712 may be at least one general-purpose processor such as IBM® PowerPC® processor that, during normal operation, processes data under the control of software 750, which may include at least one of application software, an operating system, middleware, and other code and computer executable programs accessible from a dynamic storage device such as random access memory (RAM) 714, a static storage device such as Read Only Memory (ROM) 716, a data storage device, such as mass storage device 718, or other data storage medium. Software 750 may include, but is not limited to, code, applications, protocols, interfaces, and processes for controlling one or more systems within a network including, but not limited to, an adapter, a switch, a server, a cluster system, and a grid environment.

In one embodiment, the operations performed by processor 712 may control the operations of flowchart of FIGS. 8, 9, 10a, and 10b and other operations described herein. Operations performed by processor 712 may be requested by software 750 or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, micro-code, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 718, a random access memory (RAM), such as RAM 714, a read-only memory (ROM) 716, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, such as computer system 700, partly on the user's computer, as a stand-alone software package, partly on the user's computer and partly on a remote computer or entirely on the remote computer or server, such as server 740. In the latter scenario, the remote computer may be connected to the user's computer through any type of network, such as network 702, through a communication interface, such as network interface 732, over a network link that may be connected, for example, to network 702.

In the example, network interface 732 includes an adapter 734 for connecting computer system 700 to network 702 through a link and for communicatively connecting computer system 700 to server 740 or other computing systems via network 702. Although not depicted, network interface 732 may include additional software, such as device drivers, additional hardware and other controllers that enable communication. When implemented as a server, computer system 700 may include multiple communication interfaces accessible via multiple peripheral component interconnect (PCI) bus bridges connected to an input/output controller, for example. In this manner, computer system 700 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 700, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 700, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 732, the network link to network 702, and network 702 may use electrical, electromagnetic, or optical signals that carry digital data streams. The signals through the various networks and the signals on network 702, the network link to network 702, and network interface 732 which carry the digital data to and from computer system 700, may be forms of carrier waves transporting the information.

In addition, computer system 700 may include multiple peripheral components that facilitate input and output. These peripheral components are connected to multiple controllers, adapters, and expansion slots, such as input/output (I/O) interface 726, coupled to one of the multiple levels of bus 722. For example, input device 724 may include, for example, a microphone, a video capture device, an image scanning system, a keyboard, a mouse, or other input peripheral device, communicatively enabled on bus 722 via I/O interface 726 controlling inputs. In addition, for example, output device 720 communicatively enabled on bus 722 via I/O interface 726 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

FIG. 8 illustrates a high-level logic flowchart of a process and program for activating a foreign key lookup column in a source table and automatically populating the foreign key lookup column. In the example, the process and program starts at block 800 and thereafter proceeds to block 802. Block 802 illustrates a determination whether a relational controller receives a request to activate a cached foreign key lookup for one or more foreign keys. If the relational controller receives a request to activate a cached foreign key lookup for one or more foreign keys, then the process passes to block 804. Block 804 illustrates a determination by the relational controller whether there are more foreign keys to process for the request. At block 804, if there are no remaining foreign keys to process, then the process ends. At block 804, if there are remaining foreign keys to process, then the process passes to block 806. Block 806 illustrates the relational controller getting the next foreign key to process in the request, and the process passes to block 808.

Block 808 illustrates a determination by the relational controller whether the foreign key has a foreign key lookup column. At block 808, if the foreign key does not have a lookup column, then the process passes to block 810. Block 810 illustrates the relational controller creating a foreign key lookup column in the source table for the foreign key for cached foreign key lookups, with all values set to unavailable, and the process passes to block 812. Returning to block 808, if the foreign key has a foreign key lookup column, then the process passes to block 804.

Block 812 illustrates a determination by the relational controller whether the request includes a requirement to set up cached foreign key lookup values, such as in an UPDATE request illustrated in FIG. 6. If the request does not include a requirement to set up cached foreign key lookup values, then the process passes to block 804. If the request includes a requirement to set up cached values, then the process passes to block 814. Block 814 illustrates looking up, using a standard foreign key lookup, a location of each primary key value row referenced by each foreign key value, for the foreign key lookup, by looking up a location of each primary key value row referenced by each foreign key value in an index table for the destination table, separate from the source table, or using a full table scan of the destination table. Next, block 816 illustrates the relational controller updating each foreign key lookup value in the foreign key lookup column with the retrieved lookup location for the foreign key lookup, and the process returns to block 804.

Figure 9:
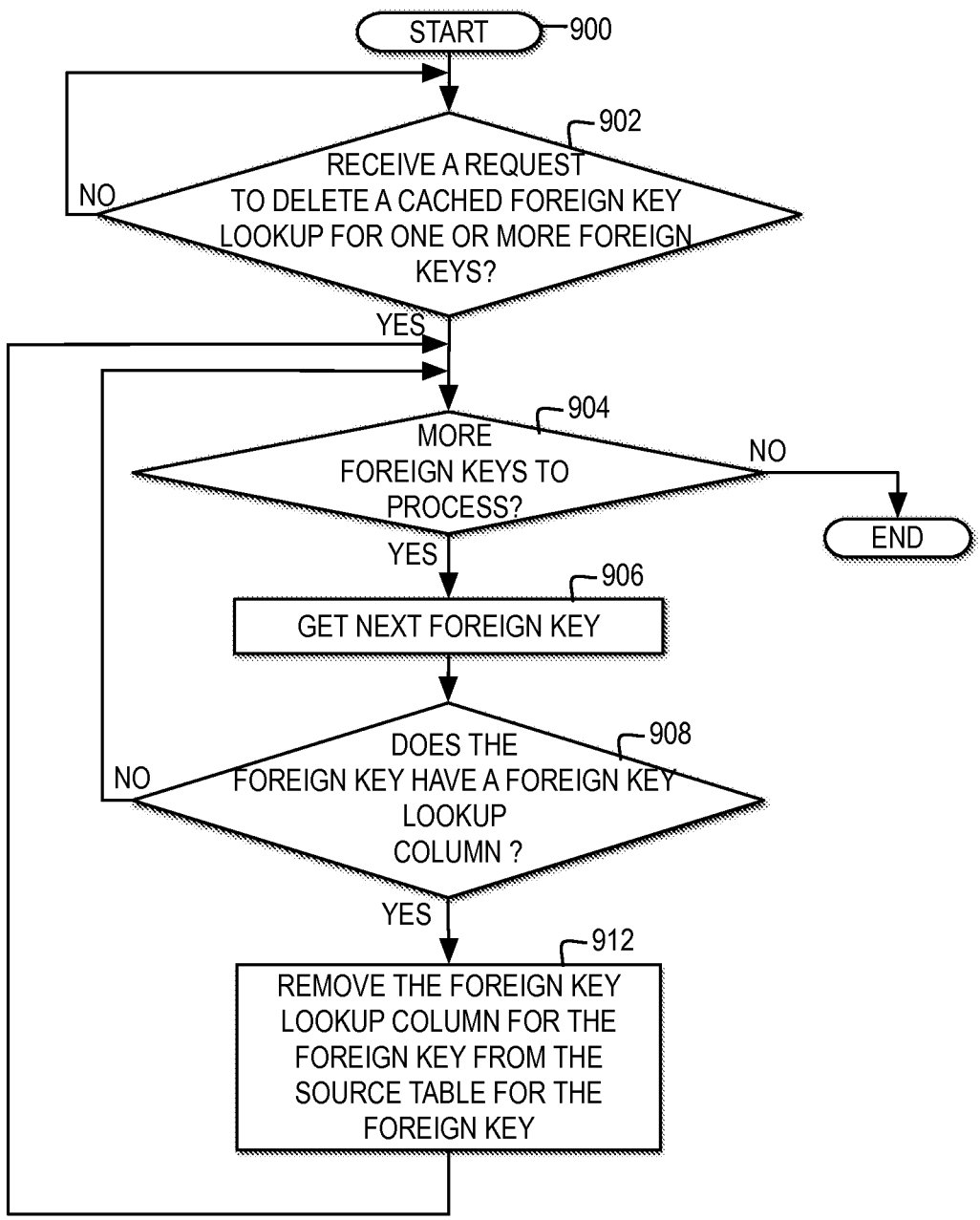
FIG. 9 illustrates a high-level logic flowchart of a process and program for deleting a foreign key lookup column in a source table.

FIG. 9 illustrates a high-level logic flowchart of a process and program for deleting a foreign key lookup column in a source table. In the example, the process and program starts at block 900 and thereafter proceeds to block 902. Block 902 illustrates a determination whether a relational controller receives a request to delete a cached foreign key lookup for one or more foreign keys. If the relational controller receives a request to deactivate a cached foreign key lookup for one or more foreign keys, then the process passes to block 904. Block 904 illustrates a determination whether there are more foreign keys to process in the request. At block 904, if there are not more foreign keys to process in the request, then the process ends. At block 904, if there are more foreign keys to process in the request, then the process passes to block 906.

Block 906 illustrates the relational controller getting the next foreign key in the request. Next, block 908 illustrates a determination whether the foreign key has a foreign key lookup column. At block 908, if the foreign key does not have a foreign key lookup column, then the process passes to block 904. At block 908, if the foreign key does have a foreign key lookup column, then the process passes to block 912. Block 912 illustrates removing the foreign key lookup column for the foreign key from the source table for the foreign key, and the process passes to block 904.

Figure 10A:
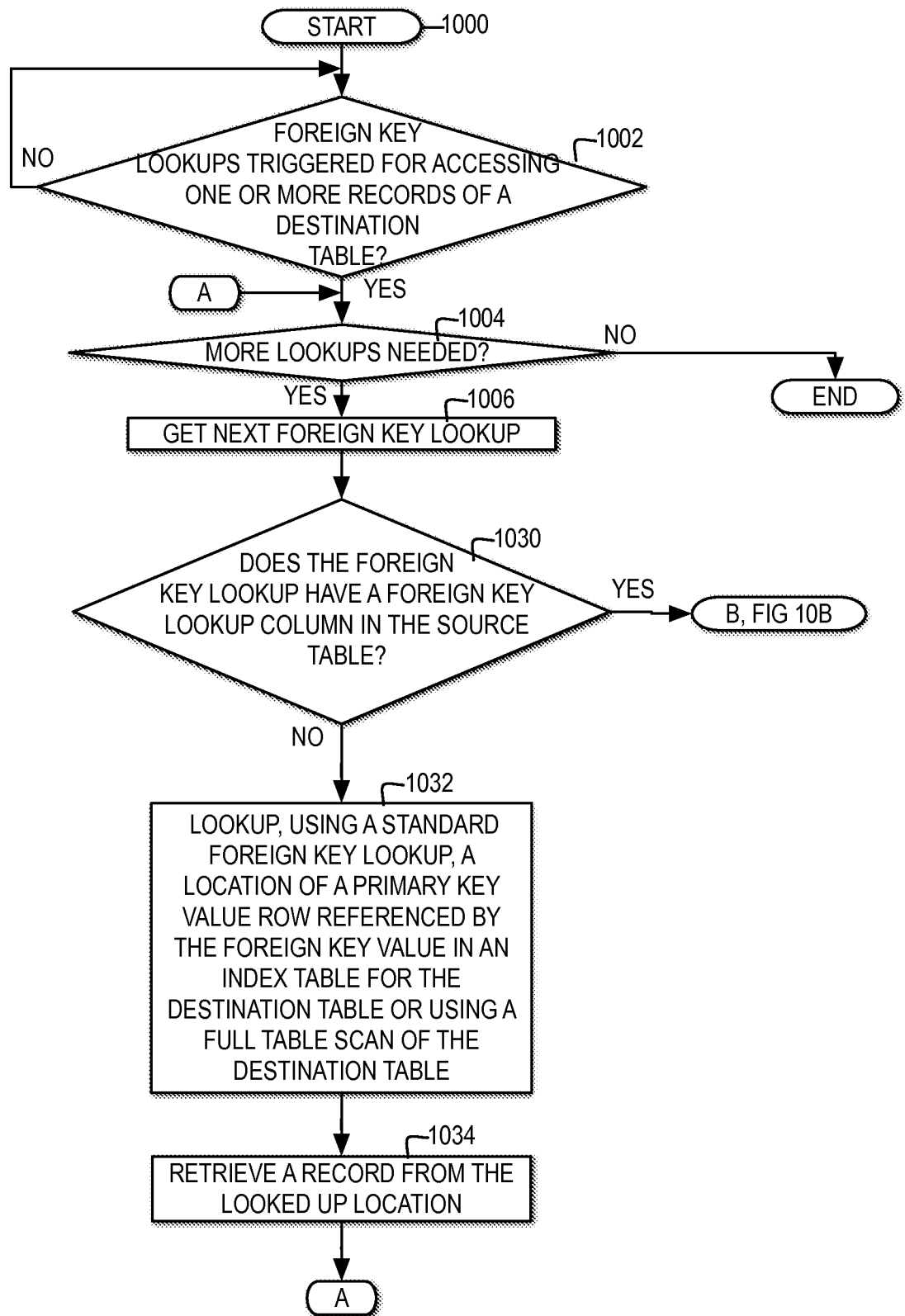
FIGS. 10*a*-10*b* illustrate a high-level logic flowchart of a process and program for managing standard foreign key lookups and cached foreign key lookups for record retrieval requests requiring foreign key lookups.
Figure 10B:
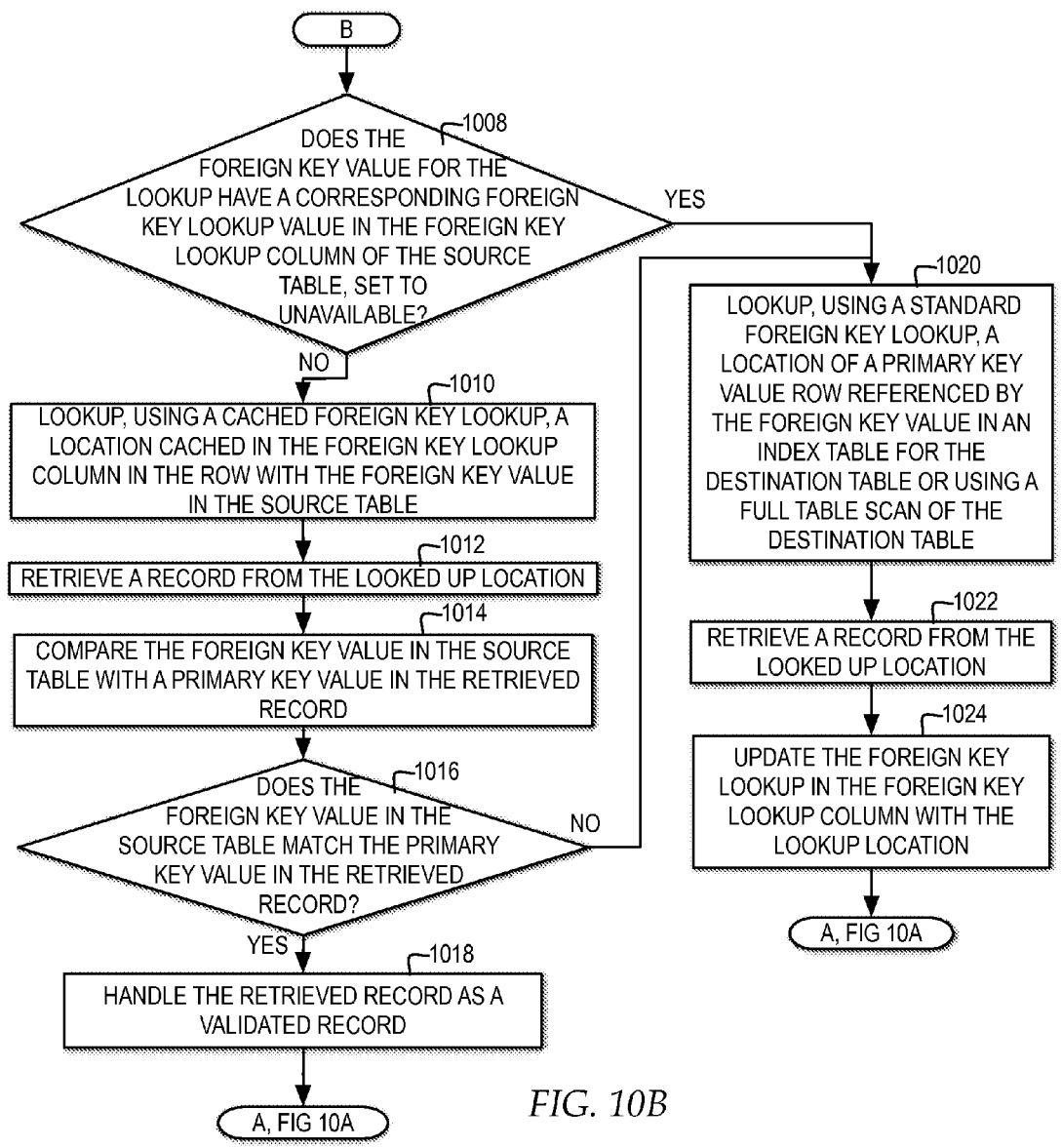

FIGS. 10*a*-10*b* illustrate a high-level logic flowchart of a process and program for managing standard foreign key lookups and cached foreign key lookups for record retrieval requests requiring foreign key lookups. In the example, the process and program starts at block 1000 and thereafter proceeds to block 1002. Block 1002 illustrates a determination whether a relational controller detects one or more foreign key lookups triggered for accessing one or more records of a destination table. In the example, if the relational controller detects a foreign key lookup triggered, then the process passes to block 1004. Block 1004 illustrates a determination by the relational controller whether more lookups are needed for the request. At block 1004, if no additional lookups are needed for the request, then the process ends. At block 1004, if additional lookups are needed for the request, then the process passes to block 1006.

Block 1006 illustrates getting the next foreign key lookup for the request. Next, block 1030 illustrates a determination whether the foreign key lookup has a foreign key lookup column in the source table. At block 1030, if the foreign key lookup does not have a foreign key lookup column in the source table, then the process passes to block 1032. Block 1032 illustrates looking up, using a standard foreign key lookup, a location of a primary key value row referenced by the foreign key value in the foreign key lookup in an index table for the destination table or using a full table scan of the destination table. Next, block 1034 illustrates retrieving a record from the looked up location, and the process returns to block 1004.

Returning to block 1030, if the foreign key lookup does have a foreign key lookup column in the source table, then the process passes to block 1008. Block 1008 illustrates a determination whether the foreign key value for the lookup has a corresponding foreign key lookup value in the foreign key lookup column in the source table, set to unavailable. At block 1008, if the relational controller detects the foreign key lookup value set to unavailable, then the process passes to block 1020. Block 1020 illustrates looking up, using a standard foreign key lookup, a location of a primary key value row referenced by the foreign key value in an index table for the destination table or using a full table scan of the destination table. Next, block 1022 illustrates retrieving a record from the looked up location. Thereafter, block 1024 illustrates updating the foreign key lookup value in the foreign key lookup column, in the row with the looked up foreign key value, with the looked up location, and the process returns to block 1004.

Returning to block 1008, if the relational controller detects the foreign key lookup value not set to unavailable, then the process passes to block 1010. Block 1010 illustrates looking up, using a cached foreign key lookup, a location cached in the foreign key lookup column in the row with the foreign key value in the source table. Next, block 1012 illustrates retrieving a record from the looked up location. Thereafter, block 1014 illustrates comparing the foreign key value in the source table with a primary key value in the retrieved record. Next, block 1016 illustrates a determination whether the foreign key value in the source table matches the primary key value in the retrieved record. At block 1016, if the foreign key value in the source table does not match the primary key value in the retrieved record, then the process passes to block 1020. At block 1016, if the foreign key value in the source table does match the primary key value in the retrieved record, then the process passes to block 1018. Block 1018 illustrates handling the retrieved record as a validated record, and the process passes to block 1004.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for managing a relational database, comprising the steps of:
   a computer, setting a foreign key lookup value to an unavailable state in a source table row containing each of a foreign key value and the foreign key lookup value in a source table in a relational database, wherein the foreign key value references a primary key value in a referenced row in a separate destination table in the relational database, wherein the foreign key lookup value when set to a value other than the unavailable state refers to a location of the referenced row of the primary key value in the separate destination table; and
   the computer, responsive to looking up, for the foreign key value, in a data structure separate from the source table, the location of the referenced row in the relational database, when the foreign key lookup value is set to the unavailable state, updating the foreign key lookup value with the location, wherein the foreign key lookup value in the source table is looked up for identifying the location of the referenced row for subsequent retrievals of the referenced row for the foreign key value, wherein the computer, responsive to looking UP, for the foreign key value, in a data structure separate from the source table, the location of the referenced row in the relational database, when the foreign key lookup value is set to the unavailable state, updating the foreign key lookup value with the location, further comprises:
   the computer, accessing the data structure separate from the source table comprising an index for the separate destination table, wherein the index comprises each separate primary key value in the separate destination table indexed to each separate location of each separate row referenced by each separate primary key value;
   and the computer, searching the index with the foreign key value to identify a particular location in the index indexed to the primary key value matching the foreign key value, wherein the index is created based on traffic levels across one or more sharing databases in a peer-to-peer network.

2. The method according to claim 1, further comprising:
   the computer, identifying the particular location in the index indexed to the primary key value matching the foreign key value as the looked up location.

3. The method according to claim 1, wherein the computer, responsive to looking up, for the foreign key value, in a data structure separate from the source table, a location of the referenced row in the relational database, when the foreign key lookup value is set to the unavailable state, further comprises:
   the computer, accessing the data structure separate from the source table, comprising, the separate destination table;
   the computer, performing a full table scan of the separate destination table to identify a particular location in the separate destination table comprising a record identified by the primary key value; and
   the computer, identifying the particular location in the full table scan of the separate destination table as the looked up location.

4. The method according to claim 1, further comprising:
   the computer, responsive to receiving a request to activate cached foreign key lookup for at least one foreign key of the source table, determining whether the at least one foreign key of the source table has a foreign key lookup column for caching the foreign key lookup value; and
   the computer, responsive to detecting the at least one foreign key of the source table does not have the foreign key lookup column, for creating the foreign key lookup column for the at least one foreign key and setting a separate foreign key lookup value in each separate row of the foreign key lookup column to the unavailable state.

5. The method according to claim 1, further comprising:
   the computer, responsive to receiving a request to set up cached foreign key lookup values for at least one foreign key of the source table, looking up, for each separate foreign key value in a foreign key column for the at least one foreign key, in the data structure separate from the source table, a separate location of each separate referenced row by each separate foreign key value; and
   the computer, caching each separate location in the associated separate foreign key lookup value, wherein the foreign key lookup value in the source table is looked up for identifying the location of the referenced row for subsequent retrievals of the referenced row for the foreign key value.

6. The method according to claim 5, further comprising:
   the computer, completing the request to set up cached foreign key lookup values without retrieving the referencing row from the location.

7. The method according to claim 1, further comprising
   the computer, responsive to receiving a request requiring access to the referenced row through the foreign key value, when the foreign key lookup value is not set to the unavailable state, looking up the foreign key lookup value in the source table and retrieving the referenced row stored at the location identified by the foreign key lookup value.

8. The method according to claim 1, further comprising
   the computer, responsive to receiving a request requiring a foreign key lookup for the foreign key value, when the foreign key lookup value is not set to the unavailable state, looking up the foreign key lookup value in the source table as the location and retrieving the referenced row stored at the location.

9. The method according to claim 1, further comprising:
   the computer, responsive to receiving a request requiring access to the referenced row through the foreign key value, when the foreign key lookup value is not set to the unavailable state, retrieving the referenced row from the location identified by the foreign key lookup value in the source table, without first looking up the location of the referenced row from a data structure separate from the destination table.

10. A computer system for managing a relational database, the computer system comprising:
one or more processors, one or more computer-readable memories and one or more computer-readable, tangible storage devices;
program instructions, stored on at least one of the one or more storage devices for execution by at least one of the one or more processors via at least one of the one or more memories, to set a foreign key lookup value to an unavailable state in a source table row containing each of a foreign key value and the foreign key lookup value in a source table in a relational database, wherein the foreign key value references a primary key value in a referenced row in a separate destination table in the relational database, wherein the foreign key lookup value when set to a value other than the unavailable state refers to a location of the referenced row of the primary key value in the separate destination table; and
program instructions, stored on at least one of the one or more storage devices for execution by at least one of the one or more processors via at least one of the one or more memories, responsive to looking up, for the foreign key value, in a data structure separate from the source table, the location of the referenced row in the relational database, when the foreign key lookup value is set to the unavailable state, to update the foreign key lookup value with the location, wherein the foreign key lookup value in the source table is looked up for identifying the location of the referenced row for subsequent retrievals of the referenced row for the foreign key value, wherein the program instructions, stored on at least one of the one or more storage devices for execution by at least one of the one or more processors via at least one of the one or more memories, responsive to looking UP, for the foreign key value, in a data structure separate from the source table, the location of the referenced row in the relational database, when the foreign key lookup value is set to the unavailable state, to update the foreign key lookup value with the location, further comprises:
program instructions, stored on at least one of the one or more storage devices for execution by at least one of the one or more processors via at least one of the one or more memories, to access the data structure separate from the source table comprising an index for the separate destination table, wherein the index comprises each separate primary key value in the separate destination table indexed to each separate location of each separate row referenced by each separate primary key value; and
program instructions, stored on at least one of the one or more storage devices for execution by at least one of the one or more processors via at least one of the one or more memories, to search the index with the foreign key value to identify a particular location in the index indexed to the primary key value matching the foreign key value, wherein the index is created based on traffic levels across one or more sharing databases in a peer-to-peer network.

11. The computer system according to claim 10, further comprising:
program instructions, stored on at least one of the one or more storage devices for execution by at least one of the one or more processors via at least one of the one or more memories, to identify the particular location in the index indexed to the primary key value matching the foreign key value as the looked up location.

12. The computer system according to claim 10, wherein the program instructions, stored on at least one of the one or more storage devices for execution by at least one of the one or more processors via at least one of the one or more memories, responsive to looking up, for the foreign key value, in a data structure separate from the source table, a location of the referenced row in the relational database, when the foreign key lookup value is set to the unavailable state, to update the foreign key lookup value with the location, further comprises:
program instructions, stored on at least one of the one or more storage devices for execution by at least one of the one or more processors via at least one of the one or more memories, to access the data structure separate from the source table, comprising, the separate destination table;
program instructions, stored on at least one of the one or more storage devices for execution by at least one of the one or more processors via at least one of the one or more memories, to perform a full table scan of the separate destination table to identify a particular location in the separate destination table comprising a record identified by the primary key value; and
program instructions, stored on at least one of the one or more storage devices for execution by at least one of the one or more processors via at least one of the one or more memories, to identify the particular location in the full table scan of the separate destination table as the looked up location.

13. The computer system according to claim 10, further comprising:
program instructions, stored on at least one of the one or more storage devices for execution by at least one of the one or more processors via at least one of the one or more memories, responsive to receiving a request to activate cached foreign key lookup for at least one foreign key of the source table, to determine whether the at least one foreign key of the source table has a foreign key lookup column for caching the foreign key lookup value; and
program instructions, stored on at least one of the one or more storage devices for execution by at least one of the one or more processors via at least one of the one or more memories, responsive to detecting the at least one foreign key of the source table does not have the foreign key lookup column, to create the foreign key lookup column for the at least one foreign key and setting a separate foreign key lookup value in each separate row of the foreign key lookup column to the unavailable state.

14. The computer system according to claim 10, further comprising:
program instructions, stored on at least one of the one or more storage devices for execution by at least one of the one or more processors via at least one of the one or more memories, responsive to receiving a request to set up cached foreign key lookup values for at least one foreign key of the source table, to look up, for each separate foreign key value in a foreign key column for the at least one foreign key, in the data structure separate from the source table, a separate location of each separate referenced row by each separate foreign key value; and program instructions, stored on at least one of the one or more storage devices for execution by at least one of the one or more processors via at least one of the one or more memories, to cache each separate location in the associated separate foreign key lookup value, wherein the foreign key lookup value in the source table is looked up for identifying the location of the referenced row for subsequent retrievals of the referenced row for the foreign key value.

15. The computer system according to claim 14, further comprising:

program instructions, stored on at least one of the one or more storage devices for execution by at least one of the one or more processors via at least one of the one or more memories, to complete the request to set up cached foreign key lookup values without retrieving the referencing row from the location.

16. The computer system according to claim 10, further comprising program instructions, stored on at least one of the one or more storage devices for execution by at least one of the one or more processors via at least one of the one or more memories, responsive to receiving a request requiring access to the referenced row through the foreign key value, when the foreign key lookup value is not set to the unavailable state, to look up the foreign key lookup value in the source table and retrieving the referenced row stored at the location identified by the foreign key lookup value.

17. The computer system according to claim 10, further comprising program instructions, stored on at least one of the one or more storage devices for execution by at least one of the one or more processors via at least one of the one or more memories, responsive to receiving a request requiring a foreign key lookup for the foreign key value, when the foreign key lookup value is not set to the unavailable state, to look up the foreign key lookup value in the source table as the location and retrieving the referenced row stored at the location.

18. The computer system according to claim 10, further comprising:

program instructions, stored on at least one of the one or more storage devices for execution by at least one of the one or more processors via at least one of the one or more memories, responsive to receiving a request requiring access to the referenced row through the foreign key value, when the foreign key lookup value is not set to the unavailable state, to retrieve the referenced row from the location identified by the foreign key lookup value in the source table, without first looking up the location of the referenced row from a data structure separate from the destination table.

19. A computer program product for managing a relational database, the computer program product comprising:
one or more computer-readable, tangible storage devices;

program instructions, stored on at least one of the one or more storage devices, to set a foreign key lookup value to an unavailable state in a source table row containing each of a foreign key value and the foreign key lookup value in a source table in a relational database, wherein the foreign key value references a primary key value in a referenced row in a separate destination table in the relational database, wherein the foreign key lookup value when set to a value other than the unavailable state refers to a location of the referenced row of the primary key value in the separate destination table; and; and program instructions, stored on at least one of the one or more storage devices, responsive to looking up, for the foreign key value, in a data structure separate from the source table, the location of the referenced row in the relational database, when the foreign key lookup value is set to the unavailable state, to update the foreign key lookup value with the location, wherein the foreign key lookup value in the source table is looked up for identifying the location of the referenced row for subsequent retrievals of the referenced row for the foreign key value, wherein the program instructions, stored on at least one of the one or more storage devices responsive to looking UP, for the foreign key value, in a data structure separate from the source table, the location of the referenced row in the relational database, when the foreign key lookup value is set to the unavailable state, to update the foreign key lookup value with the location, further comprises:

program instructions, stored on at least one of the one or more storage devices, to access the data structure separate from the source table comprising an index for the separate destination table, wherein the index comprises each separate primary key value in the separate destination table indexed to each separate location of each separate row referenced by each separate primary key value; and program instructions, stored on at least one of the one or more storage devices, to search the index with the foreign key value to identify a particular location in the index indexed to the primary key value matching the foreign key value, wherein the index is created based on traffic levels across one or more sharing databases in a peer-to-peer network.

20. The computer program product according to claim 19, wherein the program instructions, stored on at least one of the one or more storage devices, responsive to looking up, for the foreign key value, in a data structure separate from the source table, a location of the referenced row in the relational database, when the foreign key lookup value is set to the unavailable state, to update the foreign key lookup value with the location, further comprises:

program instructions, stored on at least one of the one or more storage devices for execution by at least one of the one or more processors via at least one of one or more memories, to identify the particular location in the index indexed to the primary key value matching the foreign key value as the looked up location.

* * * * *